UNITED STATES PATENT OFFICE 2,676,194

METHOD OF PREPARING A RUBBER PRODUCT AND THE PRODUCT SO OBTAINED

Jean William Lafontant, Coulommiers, France

No Drawing. Application April 15, 1952, Serial No. 282,460

Claims priority, application France April 4, 1952

5 Claims. (Cl. 260—769)

It has for long been attempted to produce synthetic rubber from terpene products on the one hand, and various hydrocarbons, on the other hand, and more particularly, from petroleum hydrocarbons.

Synthetic rubbers have been obtained in this way, but the polymerization which takes place is too long to allow an industrial use thereof.

It has also been attempted to start from a solution of rubber in turpentine oil and to contact this solution with a strong acid such as sulphuric acid, then with a reducing agent. By so doing the polymerization is accelerated through sulphonation and use of a reducing agent; but the product thus obtained is expensive as turpentine oil is scarce and the polymerization takes rather a long time.

It has then been tried to improve this process by treating a mixture of natural gum prepared in a warm condition with a mineral oil. The mixture was treated with sulphuric acid, then with an alkali. This process also has not given the expected results as it still takes a long time for the polymerization to be achieved.

The most recent process consists in starting from a solution of natural gum in cyclic hydrocarbons, in treating said solution with sulphuric acid, then with an alkali and accelerating the polymerization with trioxymethylene.

The polymerization starts quicker, but remains uncompleted and the synthetic rubber thus obtained cannot be used in practice except after a long waiting period.

The object of this invention is to obtain a synthetic rubber which polymerizes in a normal time and which, in consequence, is capable of being used in industry, the cost of it being reasonable.

According to the invention, a solution of gum in kerosene is treated, in successive stages by solutions of sulphuric acid of constantly increasing strengths.

Moreover, the solution is constantly mixed during each addition of sulphuric acid and during several hours thereafter, for instance, two hours after each addition.

The invention will now be described in more detail, with reference to a particular embodiment. Example: 100 g. of rubber reduced into very thin leaves and cut into small pieces are dissolved in 900 g. of kerosene. The solution is effected in a suitable mixer which is kept operating until the rubber is completely dissolved and a homogeneous, viscous mass is formed.

The rubber used can be either smoke sheet, or para rubber, crepe rubber or even synthetic rubber known as GRS rubber. Moreover, according to the invention, one can use as initial rubber the synthetic rubber obtained by the process according to the invention.

When the rubber is entirely dissolved in the kerosene, the sulphonation is then effected in successive stages, in contrast to the prior art processes, during which stages the mass is kept constantly stirred.

The first stage consists in adding a solution comprising 100 g. of water and 100 g. of sulphuric acid at 64–66° Beaumé. The solution of acid is slowly poured on the stirred mass which is then brewed for about 2 hours.

The acid solution must not be more concentrated than 42° Beaumé. Stronger concentrations involve the risk of having asphalts and tars precipitate which are prejudicial to the polymerization.

In the subsequent stages, the sulphuric acid solutions are also poured on the stirred mass which is brewed for two hours after each addition of acid solution.

The second stage consists in adding a solution made of 50 g. of water and 100 g. of sulphuric acid of 64–66° Beaumé.

The third stage consists in adding a solution of 40 g. of water and 100 g. of sulphuric acid of 64–66° Beaumé.

The fourth stage consists in adding a solution of 30 g. of water and 100 g. of sulphuric acid of 64–66° Beaumé.

The fifth stage consists in adding a solution of 24 g. of water and 100 g. of sulphuric acid of 64–66° Beaumé.

The sixth and seventh stages consist in adding a solution of sulphuric acid to the same amount of water, namely 16 g. of water to 100 g. of sulphuric acid, of 64–66° Beaumé.

The seventh phase is particularly for the purpose of ensuring that the sulphonation is completely achieved.

Finally, an agent for accelerating the polymerization is added such as trioxymethylene, formaldehyde or phenol.

If trioxymethylene is used as accelerating agent, this substance is obtained by preparing a solution of 110 g. of formaldehyde at 30% in weight and 100 g. of sulphuric acid at 64–66° Beaumé. This solution containing the trioxymethylene formed is then immediately poured onto the stirred mass which is then mixed for two hours.

It is important to pour the solution of formaldehyde and sulphuric acid immediately after it has been prepared so that the trioxymethylene may act in practically the nascent state.

The brewed mass is then allowed to settle for about 24 hours.

This mass is acid and is then neutralized with caustic soda or anhydrous carbonate of soda after the mixer has been set again into operation and the mass has become again unctuous and homogeneous.

The neutralization with caustic soda, for instance, is obtained by adding slowly to the stirred mass 700 g. of caustic soda in lumps or preferably in flakes. The mass heats up by the reaction of the soda on the acid, liberating mass vapor. The water is stirred until complete disappearance of the vapor.

If sodium carbonate is used for the neutralization, 900 g. of anhydrous carbonate of soda powder are added to the stirred mass.

After the mass is neutralized, it is washed with ordinary water.

Drying is effected on heated rolls and the rubber is finished when the mass begins to stick to one of the rolls.

The rubber is then allowed to dry, screened from sun and light for about a week.

The rubber obtained can be treated like natural rubber, filled, plasticized and vulcanized.

The yield of the process described is on an average of 80%.

The invention is not limited to the details of process which have been described. For instance, one may vary the proportion of rubber with respect to kerosene in the initial solution. Variable yields are then obtained. For instance, with 6% by weight of natural gum with respect to kerosene, an output of 70 to 72% is obtained. With 8% of natural gum, the yield rises to 75%. With 12%, a yield reaching 85% is obtained. Yield here means the ratio of the weight of synthetic rubber obtained with respect to the weight of the initial solution of rubber in kerosene.

It is difficult to increase the proportions of natural gum in kerosene above 12% as the mass then becomes too viscous and difficult to mix.

The kerosene used is, as known, the product recovered during the distillation of raw petroleum boiling, between temperatures of 150° and 280° C. Its average density is 0.820.

In the foregoing description and in the claims, the word rubber involves any natural or synthetic gum, smoke sheet, para rubber, crepe rubber and even rubber previously obtained by the process according to the invention which is dissolved again in kerosene.

Whatever the proportion of rubber dissolved in kerosene and comprised about between 6 and 12% (weight of rubber with respect to kerosene), the mechanical characteristics of the synthetic rubber obtained are similar.

The rubber obtained by the process which has been described in the detailed example has a breaking load of 128 kgs./cm., an elongation (%) of 650 and a Shore hardness of 40.

What I claim is:

1. The method of preparing rubber conversion products comprising forming a homogeneous mixture of rubber and kerosene containing from 6% to 12% by weight of rubber, and then sulphonating the mixture in stages while under continuous agitation consisting in adding a series of aqueous solutions of sulphuric acid of increasing concentrations, the concentration of sulphuric acid in the initially added aqueous solution being not greater than 42° Bé., and allowing the mixture to react for an appreciable length of time in between each addition of sulphuric acid solution, and adding as a polymerization accelerating agent a member of the group consisting of trioxymethylene and formaldehyde, and thereafter neutralizing, washing and drying the product thus obtained.

2. The method of preparing rubber conversion products comprising forming a homogeneous mixture of rubber and kerosene containing from 6% to 12% by weight of rubber, and then sulphonating the mixture in stages while under continuous agitation consisting in adding a series of aqueous solutions of sulphuric acid of increasing concentrations, the concentration of sulphuric acid in the initially added aqueous solution being not greater than 42° Bé., and allowing the mixture to react for an appreciable length of time in between each addition of sulphuric acid solution, separately preparing a solution of formaldehyde and concentrated sulphuric acid to form a solution containing trioxymethylene and adding said trioxymethylene solution immediately after it has been prepared to the mass containing the rubber, kerosene and sulphuric acid, and thereafter neutralizing, washing and drying the product so obtained.

3. The method of preparing rubber conversion products comprising forming a homogeneous mixture of rubber and kerosene containing from 6% to 12% by weight of rubber, and then sulphonating the mixture in stages while under continuous agitation by adding a series of aqueous solutions of sulphuric acid of constantly increasing concentrations, the concentration of sulphuric acid in the initially added aqueous solution thereof being not greater than 42° Bé., the most concentrated sulphuric acid solution so added consisting of 100 parts by weight of 64°–66° Bé. diluted with 16 parts by weight of water, repeating the addition of an aqueous solution of said most concentrated form, allowing the mixture to react for an appreciable length of time during and in between the addition of each sulphuric acid solution, adding as a polymerization accelerating agent, a member of the group consisting of trioxymethylene and formaldehyde, and thereafter neutralizing, washing and drying the product thus obtained.

4. The rubber conversion product formed by the process claimed in claim 1.

5. The rubber conversion product formed by the process claimed in claim 2.

References Cited in the file of this patent

UNITED STATES PATENTS

| Number | Name | Date |
|---|---|---|
| 1,852,346 | Fisher | Apr. 5, 1932 |
| 2,158,530 | Williams | May 16, 1939 |